Oct. 25, 1949.                C. B. MOORE                2,486,052
                      PNEUMATIC COMPARATOR GAUGE
                         Filed Oct. 25, 1945
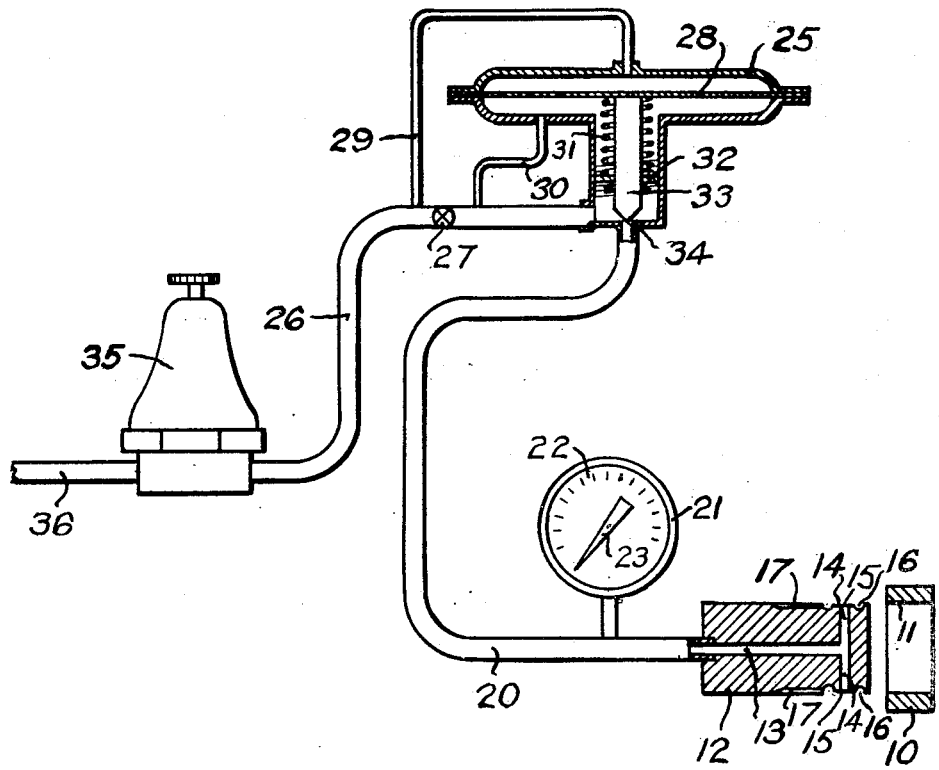
INVENTOR.
C. B. MOORE,
BY
ATTORNEY.

Patented Oct. 25, 1949

2,486,052

UNITED STATES PATENT OFFICE 2,486,052

PNEUMATIC COMPARATOR GAUGE

Coleman B. Moore, Carroll Park, Pa., assignor to Moore Products Co., Philadelphia, Pa., a copartnership Application October 25, 1945, Serial No. 624,518

8 Claims. (Cl. 73—37.5)

This invention relates to pneumatic comparator gages and more particularly to pneumatic comparator gages with improved operating characteristics.

Pneumatic gages have heretofore been proposed, operating upon the principle that if a fluid under constant pressure is forced through upstream and downstream orifices in series with one another, the gaseous pressure in the space between the orifices will be a function of the relative sections of the orifices and the measurement of the gaseous pressure in the space will indicate the effective area of the discharge or downstream orifice, as varied by the position of the work with respect thereto, within certain limits.

Pneumatic gages have also been proposed in which a gaging element is provided in a fluid leakage path, variable in size in accordance with the fit of the work with respect to the gaging element, and in which the leakage path has an associated rate of flow indicator, operating from a constant fluid pressure supply, for comparison of the size of the work being gaged with a standard size work piece.

In accordance with the present invention and in place of the constant upstream orifice provided with one class of gaging devices, or with variable rate of flow and visual indication of the rate of flow as employed with gages of another type, constant flow of gaging fluid is employed with an automatically variable restriction orifice disposed upstream.

The pneumatic comparator gage in accordance with the present invention eliminates the necessity for frequent cleaning of the small restrictions heretofore employed in pneumatic gages, reduces the air consumption for a given magnification, avoids the necessity for changes in upstream orifice sizes, provides for a greater magnification or for increase of speed of operation, other conditions being equal, provides a gage which may be adjusted to a fixed scale with interchangeable gaging members, provides a greater wear allowance, provides improved side compensation, requires less critical sizing or dimensioning of the nozzles in the manufacture thereof, and permits of increasing the magnification in pneumatic gages now in use.

The pneumatic comparator gage in accordance with the present invention can be used with prior gaging systems having a fixed upstream restriction as the primary flow control element, and when so used an exact multiple of the magnification of the prior system can be provided, if desired.

Other advantageous features of the invention will be apparent from the specification and claims.

The nature and characteristic features of the invention will be more readily understood from the following description, taken in connection with the accompanying drawing forming part hereof, in which the figure shows a diagrammatic view of a pneumatic gage in accordance with the present invention.

It should, of course, be understood that the description and drawing herein are illustrative merely, and that various modifications and changes may be made in the structure and operation disclosed without departing from the spirit of the invention.

Referring more particularly to the drawing, in which a preferred embodiment of the invention is illustrated diagrammatically, a typical work piece of hollow cylindrical form is shown at 10, the same having an internal bore or opening 11 to be measured to ascertain the diameter, taper, out-of-round, barrel, or bell-mouth condition thereof. The pneumatic gage of the present invention is not limited to gages of the internal type, this having been selected merely for purposes of explanation.

The gage illustrated includes a gage plug 12 for gaging the internal condition of the bore or opening 11 in the work piece 10. The gage plug 12 is provided with an interior fluid delivery passageway 13 and branch passageways 14 providing gaging nozzles with the nozzle openings terminating at cylindrical surfaces 15 which may be below the exterior surface of the gage plug 12. Circular grooves 16 and longitudinal slots 17 may be provided to permit of the free escape of the gaging fluid when the work piece 10 is positioned on the gage plug 12. The passageway 13 in the gage plug 12 has a conduit 20 connected thereto with which a pressure gage 21 is connected. The pressure gage 21 is preferably of the Bourdon dial type, with a visible face 22 and movable indicator pointer 23 for ascertaining the pressure conditions prevailing in the conduit 20 and the passageway 13 and, the visible face 22 is preferably calibrated in dimensional units, or with upper, zero, and lower dimensional limits thereon.

The conduit 20 is connected to a flow controller 25, which may be of any preferred type for providing constant flow of the gaging fluid. The flow controller 25 may be of the type disclosed in my copending application for Letters Patent, filed August 18, 1945, Serial No. 611,321.

The flow controller 25, illustrated diagrammatically, has a supply connection 26, and is provided with a restriction 27, preferably of fixed size and removable. The restriction 27 may be of relatively large size with consequent freedom from interference by clogging with dirt, oil or foreign particles in the stream of gaging fluid. The flow controller 25 preferably includes a fluid pressure responsive portion 28 which may be resilient and have a predetermined spring effect. The pressure responsive portion 28 is connected on one side, such as by a conduit 29, to the upstream side of the restriction 27 and connected on the other side, such as by a conduit 30, to the downstream side of the restriction 27.

A spring 31 is provided, bearing on the fluid pressure responsive portion 28, and a movable plate 32 is provided for adjustment for varying the differential across the restriction 27. The pressure responsive portion 28 preferably controls an orifice needle 33 which operates by its positioning with respect to a port 34 to determine the flow into the conduit 20.

The conduit 26 is preferably connected to an adjustable pressure regulator 35, for supplying fluid under constant pressure from a supply conduit 36. The supply conduit 36 is preferably connected to a source of fluid under pressure, and preferably filtered, and air may be and preferably is employed as the gaging fluid.

Gaging fluid, such as air, is supplied under pressure from the supply conduit 36 to the pressure regulator 35 for delivery to the conduit 26, at constant pressure. The gaging fluid passes through the conduit 26 to the flow controller 25 for supplying gaging fluid with constant flow to the gage plug 12.

The pressure on the upstream side of the restriction 27 is effective on the upper side of the fluid pressure responsive portion 28 and the pressure on the downstream side of the restriction 27 is effective on the lower side of the fluid pressure responsive portion 28. The adjustable spring 31 is also effective on the fluid pressure responsive portion 28. The differential across the restriction 27 is thus effective for positioning the fluid pressure responsive portion 28 and controls the position of the orifice needle 33 with respect to the port 34 for determining the flow into the conduit 20 and maintaining the same constant.

The fluid delivered to the conduit 20 and to the passageway 13 is discharged through the branch passageways 14, which provide gaging nozzles. If the work piece 10 is separated from the gage plug 12, fluid will be discharged through the nozzle 14 at a predetermined flow, determined by the flow controller 25. The indicator pointer 23 of the pressure gage 21 will not show any pressure within the dimension gage range under these conditions.

Upon the application of the work piece 10 to the gage plug 12, the effective areas of the nozzles 14 will be changed. The pressure in the conduit 20 will increase until the flow from the gaging nozzles 14 is in equilibrium with the flow from the flow controller 25. This action occurs very rapidly, so that the change in pressure at the pressure gage 21 and on the indicator pointer 23, to give the desired dimensional reading, also occurs with great rapidity, and without the necessity for any hesitation or delay on the part of the operator.

Since the flow is maintained constant by the flow controller 25, when the nozzles 14 are open to the atmosphere, the orifice needle 33 will be positioned closer to the port 34, and when the work piece 10 being gaged is on the gage plug 12, the orifice needle 33 will be spaced further away from the port 34.

The flow of gaging fluid is determined by the size of the restriction 27, the upstream pressure at the restriction 27 and the differential across the restriction 27. The spring effect or rate of the pressure responsive member 28 and the spring 31 may be selected and may be made low, so that the orifice needle 33 can take several different positions with respect to the valve port 34 without materially affecting the differential. If for any reason, therefore, the port 34 should become partially clogged with dirt, the needle 33 would automatically move further away from the port 34, with a negligible effect on the differential, and consequently a negligible effect on the flow. The needle 33 and the port 34 accordingly act together as an automatic restriction, and compensate for the accumulation of oil and dirt or other foreign matter at this location.

In prior pneumatic gaging apparatus, in which there was a decreasing flow of gaging fluid with increasing gaging pressure, the magnification would be less than with constant flow. The magnification could be increased by increasing the flow with increase in gaging pressure. The flow controller 25, by maintaining the flow constant, effects an increase in the pressure, indicated at the pressure gage 21, sufficient to pass the air past the gaging nozzles 14. If, however, the magnification is kept the same, the speed of operation will be increased, since the time required to build up the pressure indicated at the gage 21 is dependent on the flow.

Under normal operating conditions, a pneumatic gage exhausts to the atmosphere between gaging operations, and with prior pneumatic gages the maximum air consumption occurred between gaging operations. With the apparatus of the present invention, the air consumption is constant, during gaging and between gaging operations. It follows, therefore, that for a given magnification, the air consumption with the apparatus of the present invention is appreciably reduced.

As heretofore pointed out, by adjustment of the plate 32, a change in the differential across the restriction 27 may be effected, with corresponding change in the flow. This adjustment, together with the adjustment of the pressure regulator 35 to determine the supply pressure, may be employed to bring the pointer 23 of the gage 21 to a particular position for a given dimension and, additionally, provides an adjustment of the range. Since an increase in supply pressure tends to increase the magnification and tends to change the position of the indicator pointer 23 of the gage 21, it therefore becomes necessary to decrease the flow, as the supply pressure is increased, to effect the increase in magnification. Conversely, if it is desired to decrease the magnification, the supply pressure from the pressure regulator 35 would be decreased and the flow increased by adjustment of the plate 32. This permits of employing a printed scale on the gage 21, which can be matched with interchangeable gaging members 12.

For a given magnification, the clearance between the cylindrical surfaces 15 and the bore 11 of the work piece 10 will be greater with the apparatus of the present invention than with prior pneumatic gages with a fixed upstream restriction. The constant flow characteristic of the flow controller results in greater magnification for the same clearance. The magnification is approximately in inverse proportion to the clearance. It follows that if the clearance is increased, the wear for a given initial dimension down to slightly above the diameter of the surfaces 15 can be increased a like amount.

For a given clearance between the cylindrical surfaces 15 and the bore 11 of the work piece 10, a particular relative sidewise movement of the gaging member and the work piece is a function of the total clearance. Accordingly, if the clearance is increased, then the same movement sidewise will be a smaller proportion of the total clearance, and consequently introduces less error resulting from the nonlinearity of the nozzle characteristics.

The diameter of the nozzles 14 may be increased, with attendant increase in speed, without decreasing the clearance between the surfaces 15 and the bore 11 of the work piece 10. The use of larger nozzle sizes is advantageous from the standpoint of manufacture, since they are easier to make and variation of diameter with larger sizes is less critical in its effect.

By proper selection of the restriction 27, the sizes of the orifice needle 33 and port 34, the spring rate of the spring 31, the area of the pressure responsive portion 28, and the supply pressure, a greater or lesser magnification can be obtained. The desired magnification for a particular system may thus be readily selected, and when used with prior gaging systems an exact multiple of the magnification of such prior system can be employed.

Pneumatic gages of the measured pressure type now in use may be readily changed in accordance with the present invention to improve their operating characteristics, with increased magnification, and if desired, with matching to a fixed scale so that all plugs may be used interchangeably.

I claim:

1. In a measuring device, a source of gaging fluid under pressure, a gaging member having a discharge opening adapted to be positioned adjacent the surface of the work to be gaged, a fixed restriction member interposed between said source and said gaging member, a variable restriction member interposed between said fixed restriction member and said gaging member, means for controlling said variable restriction member in accordance with the differential across the fixed restriction member, and pressure responsive means interposed between said variable restriction member and said gaging member.

2. In a measuring device, a source of gaging fluid under pressure, a pressure regulator connected to said source, a gaging member having a discharge opening adapted to be positioned adjacent the surface of the work to be gaged, a fixed restriction member interposed between said source and said gaging member, a variable restriction member interposed between said fixed restriction member and said gaging member, means for controlling said variable restriction member in accordance with the differential across the fixed restriction member, means for varying the differential across said fixed restriction member, and pressure responsive means interposed between said variable restriction member and said gaging member.

3. In a measuring device, a source of gaging fluid under pressure, a pressure regulator connected to said source, a gaging member having a discharge opening adapted to be positioned adjacent the surface of the work to be gaged, a fixed restriction member interposed between said source and said gaging member, a variable restriction member interposed between said fixed restriction member and said gaging member, means for controlling said variable restriction member in accordance with the differential across the fixed restriction member, and indicating means interposed between said variable restriction member and said gaging member.

4. In measuring apparatus, a source of fluid under pressure, a fluid pressure regulator connected to said source, a gage member connected to said pressure regulator and having a discharge opening controlled by a dimension of the work to be gaged, means responsive to the pressure of the fluid delivered to said gage member, and flow control means interposed between said regulator and said gage member, said flow control means including a valve continuously positioned in accordance with variations in flow to maintain the flow in a predetermined relationship to the pressure of the fluid delivered to said gage member.

5. In measuring apparatus, a source of fluid under pressure, a fluid pressure regulator connected to said source, a gage member connected to said pressure regulator and having a discharge opening controlled by a dimension of the work to be gaged, indicating means responsive to the pressure of the fluid delivered to said gage member, and flow control means interposed between said regulator and said gage member, said flow control means including a valve and members for continuously positioning said valve in accordance with variations in flow to maintain the flow in a predetermined relationship to the pressure of the fluid delivered to said gage member.

6. In a measuring device, a source of gaging fluid under pressure, a fluid pressure regulator connected to said source, a gaging member connected to said regulator and having a discharge opening controlled by a dimension of the work to be gaged, a fixed restriction member interposed between said regulator and said gaging member, a variable restriction member interposed between said regulator and said gaging member, means for controlling said variable restriction member including members responsive to the pressure differential across the fixed restriction member, and means responsive to the pressure of the fluid delivered to said gaging member.

7. In a measuring device, a source of gaging fluid under pressure, a fluid pressure regulator connected to said source, a gaging member connected to said regulator and having a discharge opening controlled by a dimension of the work to be gaged, a fixed restriction member interposed between said regulator and said gaging member, a variable restriction member interposed between said regulator and said gaging member, means for controlling said variable restriction member in accordance with the pressure differential across the fixed restriction member, and indicating means responsive to the pressure of the fluid delivered to said gaging member.

8. In a measuring device, a source of fluid under pressure, a fluid pressure regulator connected to said source, a gaging member connected to said regulator and having a discharge opening controlled by a dimension of the work to be gaged, a member having a restriction interposed between said regulator and said engaging member, a valve interposed between said regulator and said gaging member positioned in accordance with the pressure effective at said restriction for determining the flow to said gaging member, and means responsive to the pressure of the fluid delivered to said gaging member.

COLEMAN B. MOORE.

REFERENCES CITED

The following references are of record in the file of this patent:

UNITED STATES PATENTS

| Number | Name | Date |
|---|---|---|
| 1,699,676 | Rush | Jan. 22, 1929 |
| 1,787,686 | Kerr | Jan. 6, 1931 |
| 2,026,187 | Mennesson | Dec. 31, 1935 |
| 2,077,525 | Mennesson | Apr. 20, 1937 |
| 2,360,705 | Moore | Oct. 17, 1944 |

FOREIGN PATENTS

| Number | Country | Date |
|---|---|---|
| 508,828 | Great Britain | July 6, 1939 |